United States Patent [19]
Stefandl

[11] Patent Number: 6,140,463
[45] Date of Patent: Oct. 31, 2000

[54] PROCESS FOR RECYCLING AND RECOVERY OF PURIFIED NYLON POLYMER

[76] Inventor: Roland E. Stefandl, 62 Cider Hill, Upper Saddle River, N.J. 07458

[ * ] Notice: This patent issued on a continued prosecution application filed under 37 CFR 1.53(d), and is subject to the twenty year patent term provisions of 35 U.S.C. 154(a)(2).

[21] Appl. No.: 09/191,385

[22] Filed: Nov. 13, 1998

Related U.S. Application Data

[63] Continuation-in-part of application No. 08/802,202, Feb. 18, 1997, Pat. No. 5,898,063.

[51] Int. Cl.[7] ............................ C08G 69/46; C08G 73/10; C08F 6/00
[52] U.S. Cl. ........................... 528/480; 528/486; 528/491; 528/497; 528/499; 528/501; 528/502; 528/503; 241/14; 241/18; 241/19
[58] Field of Search ...................................... 528/499, 480, 528/497, 501, 491, 486, 502, 503; 241/14, 19, 18

[56] References Cited

U.S. PATENT DOCUMENTS

| | | | |
|---|---|---|---|
| 2,639,278 | 5/1953 | Stott et al. ................................ | 260/78 |
| 3,006,867 | 10/1961 | Simon . | |
| 3,696,058 | 10/1972 | Teti . | |
| 4,003,880 | 1/1977 | Sidebotham et al. . | |
| 4,003,881 | 1/1977 | Sidebotham et al. . | |
| 4,064,079 | 12/1977 | Sidebotham et al. . | |
| 4,118,187 | 10/1978 | Sidebotham et al. . | |
| 4,137,393 | 1/1979 | Sidebotham et al. . | |
| 5,198,471 | 3/1993 | Nauman et al. . | |
| 5,240,530 | 8/1993 | Fink . | |
| 5,241,066 | 8/1993 | Davis et al. . | |
| 5,278,282 | 1/1994 | Nauman et al. . | |
| 5,280,105 | 1/1994 | Moran, Jr. . | |
| 5,288,349 | 2/1994 | Fink . | |
| 5,294,384 | 3/1994 | David et al. . | |
| 5,342,854 | 8/1994 | Serad . | |
| 5,370,757 | 12/1994 | Corbin et al. . | |
| 5,430,068 | 7/1995 | Subramanian . | |
| 5,518,188 | 5/1996 | Sharer . | |

FOREIGN PATENT DOCUMENTS 0 759 456 A1  2/1997  European Pat. Off. .

OTHER PUBLICATIONS

Starkweather, Jr., et al., "Crystalline Transitions in Powders of Nylon 66 Crystallized from Solution," Journal of Polymer Science: Polymer Physics Edition, vol. 19, 467–477 (1981) The Month in the Date of Publication is not Available.

*Primary Examiner*—P. Hampton-Hightower
*Attorney, Agent, or Firm*—Banner & Witcoff, Ltd.

[57] ABSTRACT

The invention comprises an improved recycling and recovery process for rugs, flooring, carpeting, carpeting materials, and other textiles particular from waste carpet containing at least some synthetic fiber backing materials, and at least some nylon as well, and more particularly for the separation and recovery of the nylon polymers in purified and reusable condition and also recovery of other polymeric fibers and materials which may be present and can be recycled and reused.

18 Claims, No Drawings

6,140,463

PROCESS FOR RECYCLING AND RECOVERY OF PURIFIED NYLON POLYMER

CROSS REFERENCE TO RELATED APPLICATIONS

This patent application is a continuation-in-part of patent application Ser. No. 08/802,202, filed Feb. 18, 1997 and entitled "Carpet Recycling Process for Nylon Containing Carpeting" now U.S. Pat. No. 5,898,063.

FIELD OF THE INVENTION

The invention comprises methods and processes for recycling and recovering purified nylon from nylon-containing carpeting which includes, but is not specifically limited to the stepwise separation using a selective solvent or a combination of selective solvents and using limited and controlled temperatures in each step for the methods and processes. The steps include, but are not limited to, a) reducing carpet size to granular form, b) washing and/or filtering as necessary to remove inert solids, dirt and fillers, c) stepwise separation of backing, adhesive and various types of fibers and repeating all or certain significant selected steps as may be required. To obtain the desired and herein described purified nylon fiber it is necessary to repeat the separation and purification steps at least one additional time and preferably, for best results, additional repetitions of the steps are considered for best final results and the purest products.

BACKGROUND OF THE INVENTION

The use of synthetic fibers has increased in many areas of technology. Among those areas which have had a very great and varied increase is carpets, area rugs, carpeting and all types of floor covering. The teachings and publications in this and related fields are quite extensive and describe details for separating, reconstituting, recovering, purifying and variously treating and handling used textiles and carpeting and include natural and synthetic fibers in the processing and recovery steps.

More specifically, U.S. Pat. No. 3,006,867 (Simon) discloses a method of reconstituting a synthetic plastic, such as and including nylon from waste and used materials and include textile wastes having nylon fibers. The method consists of dissolving the waste material from the synthetic plastic in formic acid, mixing a hydrocarbon selected from n-hexane, cyclohexene, n-heptane, cyclohexane, hexene, benzene, and toluene with the formic acid-plastic solution in an amount sufficient to form an azeotropic mixture, then heating the azeotropic mixture to a temperature sufficient to vaporize the azeotropic mixture and removing (recovering) the vapors from the distillation zone to leave behind the desired synthetic plastic being recovered.

U.S. Pat. Nos. 4,003,880; 4,003,881; 4,118,187 and 4,137,393 (Sidebotham et al.) variously disclose methods for recovering polyester from dyed polyester fibers as in fabrics, textiles, carpeting and commercial products. Only polyesters are involved in the recovery steps. While the conditions and procedural steps vary in the patent disclosures, there are certain steps which are disclosed in and utilized in all these patent processes. These steps generally include:

1) Contacting collections of yarns, fibers, and fabrics, including dyed polyester fibers with a dye-stripping solvent for polyester polymer, which is preferably not a solvent for the remaining constituents, at a temperature below which the polyester fiber dissolves and above the temperature where the crystal lattice of the polyester fibers swell so as to release the dye, thereby stripping the dye from the polyester fibers;
2) Removing the excess of the dye-containing, dye-stripping solvent which is not absorbed by the fibers and fabrics;
3) Contacting the fibers (which may contain residual dye-stripping solvent) with a sufficient addition of a primary dissolution solvent under selective dissolution conditions for polyester fibers;
4) Removing the undissolved fibers or the other impurities from the solution; and
5) Separating the solvent or solvents from the polyester by evaporating the solvent from the dissolved and/or molten polyester without precipitating the polyester from the solution.

It is significant and important to point out that none of these recovery methods disclose or suggest any steps or detailed recovery procedures for nylon. Rather, they are limited to specific dissolution techniques for recovery of the unrelated polymer, polyester. In another U.S. Pat. No. 4,064,079 (Sidebotham et al.) a modified polyester recovery method is disclosed which does not include a step for removal of dye from the polyester fibers.

U.S. Pat. Nos. 5,240,530 and 5,288,349 (Fink) teach a carpet recycling and recovery method in which portions of the carpet are initially ground and melted for a feedstock. Carpets containing different types of materials are ground mechanically so that the contained fiber length is reduced between ¼" and ⅟16". These fibers are then separated in an aqueous bath on the basis of specific gravity. Neither of these patents teach or suggest separating nylon fibers from polyester fibers by subjecting the mixed fibers to water and then heat, that is, there are no extraction steps disclosed.

U.S. Pat. No. 5,294,384 (David et al.) discloses a method for converting waste carpet material into a thermoplastic composition. As starting material, the carpet samples (waste) may have any pile weight and also may be comprised of non-homogenous mixtures of components. The samples are melt blended with or without a compatibilizer in a temperature range of from 250 degrees Celsius to 260 degree Celsius and at a pressure of from about 350 to 450 psi and a shear rate of about 200–400/sec.; most preferably this step is carried out in a twin screw extruder. The blends thus formed may then be pelletized or processed into other commercially acceptably forms. Blend compositions which are disclosed include mixtures of nylon, polyolefins, SBR latex, and inorganic fiber. Using the method described in this patent, no attempt is made (no steps included) to separate the fiber mixture into their constituent parts or fractions; rather, the mixtures are merely transformed into a different mixture having a different form from the starting components.

In U.S. Pat. No. 5,370,747 (Corbin et al.) a carpet product is disclosed which has two distinct sections, a top section constructed entirely from nylon (Nylon 6) and a bottom section. The top section is thus easily removable from the bottom section for replacement thereof without any damage to the bottom section. After such removal, the top section can then be recycled to e-Caprolactrum for re-use in Nylon 6 carpet or it can be used in other Nylon-6 products.

Further, U.S. Pat. No. 5,342,854 (Serod) describes a method for separating and recovering polyester from polyester/cotton blends. The polyester/cotton material is cut and chopped into small pieces and then dried. These dried scraps are placed into a vessel containing a sulfone solvent such as an alkyl sulfone having from 1 to 10 carbon atoms and heated to 150 degrees Celsius. The mixture is steeped (with agitation) for about 90 minutes at this temperature. Thereafter, the temperature of the mixture is raised to 190 degrees Celsius and maintained thus for about another 35 minutes. The solvent containing polyester is then separated for further treatment to precipitate the recovered polyester. There are no methods or steps described for separating the polyester from any other polymeric systems or other polymeric fibers.

U.S. Pat. No. 5,198,471 does not teach a process related to this invention. There is no disclosure of nylon fibers, carpet, or any of the solvents. In U.S. Pat. No. 3,696,058 (Tate) a process is disclosed for recovering solid scrap thermoplastic polymers such as polyamides and polyesters. The process comprises the following steps:

(a) dissolving said thermopolastic polymer in hexafluorisopropanol, (b) filtering said polymer solution (c) mixing the polymer solution with an excess of water at a temperature of from 60 to 100 degrees Celsius, and (d) separating the precipitated polymer from the water, wherein the thermoplastic polymer is selected from the group consisting of polyamide, polyester, polyacrylonitrile and polyacetal.

In this patent the solvents employed for the polymer are fluoroalcohols. It has been known to use formic acid and sulfuric acid as well as various types of solvents such as for instance ethylene glycol, propylene glycol, meta-cresol and various triglycerides and fatty acids to dissolve nylon polymeric materials as a step in producing cast polyamide fibers including nylon fibers.

SUMMARY OF THE INVENTION

It is an objective of this invention to provide a recycling and detailed purification process for carpeting material containing one or more species including nylon polymers and, or nylon fibers. The nylon fiber may be the major synthetic component or it may be present in minor amounts with other non-nylon materials having major component proportions. It is also an objective to describe processes for separating and recovering plastic and polymer components of carpeting, used carpets, carpets scraps and the like. The object of the invention is specifically directed to mixtures of synthetic carpeting materials, one or more components or portions of which contain nylon, and particularly in which a relatively high proportion of the carpeting is nylon. Another objective is to provide an economical, practical and environmentally acceptable method for recovery of components from carpeting materials containing nylon polymers. Another specific objective is to recover both highly pure Nylon 6 and Nylon 6,6 from nylon containing carpet scrap and used carpeting.

A further object is to separate and recover purified nylon polymer from carpeting containing other polymers such as polyesters, polyamides, P.E.T. (Poly-ethylene tereptitalate) and other polymers as well as natural fibers.

It is a further and specific object to remove from the recovered nylon fiber all impurities and recover a purified nylon free of fillers, pigments, stabilizers, metallic and metal-containing compounds, dyes, and any and all processing and polymerizing aids.

Another object is to provide an efficient recycling process for nylon containing carpeting materials or any other material containing nylon. Other objectives will be disclosed in the detailed description of the invention process described herein below.

DESCRIPTION OF THE INVENTION

At present there are a number of different but related reasons and objectives which make carpet recycling of prime importance. There are both environmental and economic reasons for the drive with respect to recycling processes and methods. Practical and economic values are advantageous for limiting landfill usage for the old and discarded carpeting as well as otherwise useless carpeting scraps.

Recycling generally can include methods for reprocessing or reconditioning for use as such, conversion of the carpeting or the components thereof into a new or different product which may have a different and often less demanding or more generic application, or use of one or more processes or process steps in a way which recovers all or part of the value of the components.

In the processes of this invention, a number of these advantages and objectives are achieved.

This invention broadly relates to the recycling and recovery of products and specifically, highly purified nylon fibers and polymers, from carpeting in which the fibers contain at least substantial quantities of nylon as well as other components such as polyester including P.E.T. (poly-ethylene terephthalate). In addition, acrylic fibers may be present as well as various olefinic resins. Also, in some instances, natural fibers such as cotton and/or wool may also be present. Many other components and additives are also commonly present in commercial and household carpeting.

The carpeting, which is subject to recycling, also has a backing material which may be for instance include polypropylene, polyethylene, acrylic resin, a straw-burlap material known commercially as "JUTE", a mixture of these with possibly other materials in smaller amounts.

It is also commonly required that some kind of "glueing" agent or adhesive be present at least in a minor amount in order to attach and securely bind the fibers of the carpet to the backing. Such adhesives or "glueing" agent, during the recovery process, become part of the inert by-product stream and thus remains a part of the inert fraction. It is most important for the results of this process to remove all of such agents from the purified, recovered nylon.

The process of this invention can be advantageously and quite satisfactorily practiced with any carpet as the starting material, provided only that there is some substantial amounts of reusable nylon fibers present. For instance, the nylon can be of the type known commercially as Nylon 6 (poly-6-aminocaprioic acid), Nylon 6,6 (poly-hexamethyleneadipamide), Nylon 8 (poly-8-aminocaprylic acid), Nylon 11 (poly-11-aminoundecanoic acid), and Nylon 6,10 (poly-hexamethylene sebacamide).

It is not necessary, or at least not practical or highly effective, to separate the carpet fibers from the backing that is, because the release of the adhesive from the fibers during the recovery step can effectively be accomplished. It is also not generally necessary to remove the adhesive initially as a separate step since whatever remains with the fiber will remain as a solid residue in the subsequent and inventive series of separation steps of the invention.

In one preferred embodiment of the invention, the starting material which is ground carpeting product and preferably primary comprising the nylon containing fibers, are admixed with a selective solvent. This solvent must be appropriately selected primarily based on the carpeting composition and can be a glycolic compound such as ethylene glycol or propylene glycol or glycerol and various mixtures of these solvents. This solvent may also be an organic formate, such as methyl or ethyl formate, hydrochloric acid, formic acid, methanol, nitric acid, glacial acetic acid, fluorinated alcohols, m-cresol, phenolic compounds, chloroformmethanol, methanol-lithium chloride, potassium thiocyanate, benzyl alcohol, butane diol 1,1, dimethyl sulfoxide, triethylene glycol, and tetraethylene glycol. Various mixtures of these solvent materials can also be used in special circumstances depending on the carpeting composition.

It has been found by actual testing and experimentation that glycerol is the most effective solvent and is preferred for use in each step for isolation and recovery of the nylon components in the fibers, although it can be used in combination, or stepwise with other solvents as needed. It is found to be the most environmentally friendly solvent of those listed.

The basis for the separation of the types of nylon fractions in each series of steps of the invention for both (Nylon 6 and Nylon 6,6) is the relative solubility of the two types of nylon polymer in the solvent depending on the temperature. Thus, the different types can be identified, separated and removed by varying the temperature and by controlling the conditions in each of the various steps and series of steps. The nylon 6 fraction is soluble in glycerol at 155 degrees Celsius whereas the Nylon 6,6 is soluble at 195 degrees Celsius, all the nylon polymers will be dissolved. Then the mixture is cooled and the nylon 66 will not be soluble and can be separated and removed as a solid. Further cooling, to about 150 degrees Celsius will cause the Nylon 6 to separate and it can be removed as a solid.

The process can also be carried out by selective heating of the fibers in solution. At a temperature of about 150 degrees Celsius the Nylon 6 will be dissolved and can then be separated with the glycerol and the Nylon 6,6 is thus the remaining solid which has not been heated to a sufficiently high temperature to dissolve. It is very important and an essential element of this invention to repeat separation steps one or more times in order to obtain a pure nylon final product.

The nylon which is recovered as a solution in glycerol or other organic solvent can be easily recovered by precipitation upon cooling, followed by washing with water where as the solid nylon polymer separates from the liquid solution.

The series of steps is preferably repeated on the solid nylon product which has been obtained. The steps can, under some circumstances, be repeated on the nylon and solvent mixtures. The many advantages include the ability to separate the nylon polymers from other polymers, adhesives and fibers, using safe, environmentally acceptable steps to recover clean, relatively pure nylon polymers. Another advantage is that there is a relatively simple, economical and effective step which is readily included to separate Nylon 6 from Nylon 6,6 and recover both in a pure form.

It is a most important advantage of this improved process that the nylon recovered is completely purified and all the fillers, dyes, stabilizers, metallic components, and processing aids normally present have been completely and safely removed.

SPECIFIC EXAMPLE

Example 1

This process and the series of steps thereof relate to the improved recovery of nylon, particularly Nylon 6,6 both from home and commercial carpets. Carpet containing Nylon 6,6 is dissolved in a hot, highly pure glycerol at elevated temperatures. At high temperatures, nylon oxidizes with oxygen and/or hydrolysis with water. To prevent oxidation various stabilizers may be added to the solvent. Alternatively, working under a nitrogen environment renders an effective protection against nylon degradation from both oxidation and hydrolysis.

Upon dissolution, the solution is quickly withdrawn to a dry vessel where it is quickly cooled to 40 degrees Celsius or lower. The solution is washed with water to remove traces of glycerol, then filtered, and lastly dried under vacuum at 40 to 60 C to recover the nylon polymer. The following is an example of the method used in practicing this recovery and recycling process:

1) 1200 ml of pure glycerol is heated to and maintained at 205° C. and 1 ATM. of pressure in a stirrer equipped vessel where it is uniformly stirred at a moderate speed,
2) Meanwhile, a constant stream of nitrogen gas is applied to the solvent as it heats up to purge out any residual oxygen,
3) 100 grams of Dupont Staimnaster carpet is added to the hot solvent.
4) The initial carpet fiber is sampled and found to be Nylon 6 with a relative viscosity of 1.7,
5) 15 minutes after all the nylon is initially dissolved, the resulting solution is pumped out of the heating vessel via a heated 0.25 inch diameter stainless steel pipe into a dry flask that is sitting in an ice bat,
6) When the solution cools down to 40 C or below it is washed with water at a ratio of 20:1 water:solution by volume and filtered, for the final wash,
7) For the wash step, potassium iodine (Kl) is added to the water as a heat stabilizer for the future processing steps.
8) The resulting solution is filtered and the filter cake is dried in an oven purged with nitrogen, then under vacuum allowed to dry at 45° C. for three days.

At this stage, in order to provide the highest purity of nylon polymer to be obtained in this improved recovery method, the foregoing steps 5, 6, 7 and 8 are repeated at least once and preferably two, or three times or more. The number of times in which these dissolutions, treatment, and recovery of solid nylon polymer are repeated depends on the purity of the product required, and also on the composition and presence of unwanted materials in the initial carpeting being recycled and recovered.

Final Step)

The final material is checked for its purity and relative viscosity (RV). The final material generally exhibits an increase in relative viscosity to 2.30, which is an improvement over that obtained by only one recovery/processing step.

What is claimed is:

1. In a process for separating nylon from nylon-containing carpeting comprising (1) dissolving the nylon in the carpeting in a solvent at at least the dissolution temperature of the nylon in the solvent, (2) removing the solvent containing the dissolved nylon from any remaining solid residue, (3) cooling the solvent-nylon solution to precipitate nylon and (4) recovering the precipitated nylon from the solvent, the improvement comprising repeating steps (1), (2), (3) and (4) at least one additional time.

2. The process of claim 1 wherein at least two types of nylon are present in the carpeting, wherein only a first type of nylon is initially recovered by dissolving the first type of nylon in a solvent at at least the dissolution temperature of the first type of nylon in the solvent, but below the dissolution temperature of remaining types of nylon, removing the solvent containing the dissolved first type nylon from any remaining solid residue, and repeating the dissolution for each of the remaining types of nylon.

3. The process of claim 1 wherein at least two types of nylon are present in the carpeting, wherein the at least two types of nylon are dissolved in a solvent at at least a temperature wherein all the types of nylon are dissolved; cooling the solvent to a temperature for which one type of nylon precipitates out, but above the dissolution temperature of the remaining types of nylon; removing the precipitate; and then cooling the solvent to a temperature for which another type of nylon precipitates out and repeating the removal of precipitate and cooling steps until all types of nylon have been precipitated.

4. The process of claim 2 wherein two types of nylon are present in the carpeting.

5. The process of claim 4 wherein the two types of nylon are Nylon 6 and Nylon 6,6.

6. The process of claim 3 wherein two types of nylon are present in the carpeting.

7. The process of claim 6 wherein the two types of nylon are Nylon 6 and Nylon 6,6.

8. The process of claim 1 further comprising reducing the carpeting to granular particulate form prior to dissolving the nylon.

9. The process of claim 8 further comprising separating inert solids and non-fibrous fillers from the carpet prior to dissolving the nylon.

10. The process of claim 1 wherein the carpeting contains at least one other fiber.

11. The process of claim 10 wherein the at least one other fiber comprises a synthetic polymer fiber.

12. The process of claim 11 wherein the at least one other fiber is a polyester.

13. The process of claim 11 wherein the at least one other fiber is a polyamide.

14. The process of claim 11 wherein the at least one other fiber is a terephthalate polymer.

15. The process of claim 11 wherein the at least one other fiber comprises a natural fiber.

16. The process of claim 1 wherein the solvent is glycerol.

17. The process of claim 1 wherein the solvent is ethylene glycol.

18. The process of claim 1 wherein the solvent is propylene glycol.

* * * * *